United States Patent [19]
Cohen et al.

[11] Patent Number: 5,621,654
[45] Date of Patent: Apr. 15, 1997

[54] SYSTEM AND METHOD FOR ECONOMIC DISPATCHING OF ELECTRICAL POWER

[75] Inventors: Jason M. Cohen, West Islip; Douglas B. Page, Smithtown, both of N.Y.

[73] Assignee: Long Island Lighting Company, Hicksville, N.Y.

[21] Appl. No.: 228,225

[22] Filed: Apr. 15, 1994

[51] Int. Cl.$^6$ ................................................. G06F 17/60
[52] U.S. Cl. .................... 364/493; 364/156; 364/464.22; 364/492
[58] Field of Search ........................ 73/112; 307/68; 364/156, 464.01, 464.04, 492, 493

[56] References Cited

U.S. PATENT DOCUMENTS

| | | | |
|---|---|---|---|
| 2,836,730 | 5/1958 | Early | 364/493 X |
| 2,836,731 | 5/1958 | Miller, Jr. | 364/493 X |
| 2,841,331 | 7/1958 | Starr et al. | 364/493 |
| 2,861,196 | 11/1958 | Brownlee | 364/493 X |
| 2,866,102 | 12/1958 | Cohn | 364/493 X |
| 2,871,374 | 1/1959 | Early | 364/493 X |
| 2,871,375 | 1/1959 | Early | 364/493 X |
| 3,000,566 | 9/1961 | Edelmann | 364/493 X |
| 3,001,714 | 9/1961 | McKinley et al. | 364/493 |
| 3,005,589 | 10/1961 | Harder | 364/493 X |
| 3,117,221 | 1/1964 | Kirchmayer | 364/493 X |
| 3,124,699 | 3/1964 | Kirchmayer | 364/493 X |
| 3,226,932 | 1/1966 | Strohmeyer, Jr. | 60/73 |
| 3,229,110 | 1/1966 | Kleinbach et al. | 364/493 X |
| 3,270,209 | 8/1966 | Cohn | 364/493 X |
| 3,359,551 | 12/1967 | Dennison | 364/492 X |
| 3,400,258 | 9/1968 | Staellin | 364/493 |
| 3,555,251 | 1/1971 | Shavit | 364/493 X |
| 3,758,762 | 9/1973 | Littman et al. | 318/561 X |
| 3,782,113 | 1/1974 | Luongo | 60/73 |
| 3,832,533 | 8/1974 | Carlson et al. | 444/1 |
| 3,859,007 | 1/1975 | Kowalski et al. | 60/660 |
| 3,911,286 | 10/1975 | Uram | 60/646 X |
| 3,928,972 | 12/1975 | Osborne | 60/646 |
| 3,932,735 | 1/1976 | Giras | 364/493 |
| 4,019,390 | 4/1977 | Smith et al. | 60/660 |
| 4,027,145 | 5/1977 | McDonald et al. | 60/645 X |
| 4,039,804 | 8/1977 | Reed et al. | 60/646 X |
| 4,053,746 | 10/1977 | Braytenbah et al. | 364/494 |
| 4,057,736 | 11/1977 | Jeppson | 307/78 |
| 4,069,675 | 1/1978 | Adler et al. | 364/492 X |
| 4,096,699 | 6/1978 | Zitelli | 60/657 |
| 4,166,762 | 9/1979 | Bloch | 60/644 X |
| 4,178,762 | 12/1979 | Binstock et al. | 60/667 |
| 4,178,763 | 12/1979 | Stern et al. | 60/667 |
| 4,179,742 | 12/1979 | Stern et al. | 364/494 |
| 4,262,209 | 4/1981 | Berner | 307/68 X |
| 4,272,686 | 6/1981 | Suzuki | 290/54 |
| 4,280,060 | 7/1981 | Kure-Jensen et al. | 290/40 R |
| 4,297,848 | 11/1981 | Silvestri, Jr. | 60/660 |
| 4,314,441 | 2/1982 | Yannone et al. | 60/39.28 R |
| 4,320,625 | 3/1982 | Westphal et al. | 60/646 |
| 4,419,733 | 12/1983 | Ross | 364/493 |
| 4,514,642 | 4/1985 | Ross | 290/40 R |
| 4,550,380 | 10/1985 | Bukowski et al. | 364/494 |
| 4,576,007 | 3/1986 | Arakawa et al. | 60/660 |
| 4,577,280 | 3/1986 | Putman | 364/494 |
| 4,577,281 | 3/1986 | Bukowski et al. | 364/494 |
| 4,745,758 | 5/1988 | Putman et al. | 60/676 |
| 4,792,912 | 12/1988 | Kuramoto et al. | 364/557 |
| 4,811,565 | 3/1989 | Hwang | 60/646 |
| 4,819,435 | 4/1989 | Silvestri, Jr. | 60/657 X |
| 4,866,940 | 9/1989 | Hwang et al. | 60/657 X |
| 4,881,184 | 11/1989 | Abegg, III et al. | 73/116 X |
| 4,888,954 | 12/1989 | Silvestri, Jr. | 60/660 |
| 4,891,948 | 1/1990 | Kure-Jensen et al. | 60/645 |
| 4,941,113 | 7/1990 | Dundics et al. | 364/494 X |
| 5,132,920 | 7/1992 | Bellows et al. | 364/551.01 |
| 5,278,772 | 1/1994 | Knupp | 364/492 |
| 5,347,466 | 9/1994 | Nichols et al. | 364/492 |
| 5,432,710 | 7/1995 | Ishimaru et al. | 364/492 X |

*Primary Examiner*—Edward R. Cosimano
*Attorney, Agent, or Firm*—Dilworth & Barrese

[57] ABSTRACT

The present invention relates to methods and systems for economically dispatching electrical power. The present invention utilizes real-time heat rates for a plurality of power generating units, e.g., steam turbines, and corresponding emission data for each unit, to dispatch electrical power at the lowest possible cost. The method of the present invention also compares the cost associated with generating power to the cost to purchase power from other electric utilities to achieve maximum cost savings associated with the dispatching of the electrical power.

18 Claims, 7 Drawing Sheets

SYSTEM AND METHOD FOR ECONOMIC DISPATCHING OF ELECTRICAL POWER

BACKGROUND OF THE INVENTION

1. Field of the Invention

The present invention relates to a system and method for efficiently and economically dispatching electrical power generated by power stations. More particularly, the present invention continuously monitors operating parameters for each power generating unit in the power stations, calculates the heat rate in real time and monitors exhaust emissions to determine the efficiency of each operating unit, and dispatches the power generated based upon the heat rate and emission efficiency calculations.

2. Description of the Related Art

In modern electrical power generation systems, steam turbines are utilized to generate electrical power. The production of electricity often requires a substantial capital investment to provide the necessary equipment to produce the electricity. In addition, the costs relating to the operation and maintenance of the equipment is also substantial. In an effort to reduce the high operating costs associated with generating electricity, electric utilities attempt to ascertain which steam turbines are operating efficiently and utilize those turbines to generate the power. Inefficient turbines may then be cleaned or serviced while the efficient turbines generate power.

The heat rate of a steam turbine generating unit has long been the key to economic dispatching, and efficient power generation system operation. The heat rate of each turbine provides a dispatch operator with the operational efficiency for each turbine so that the costs associated with placing particular turbines "on-line" can be ascertained and compared to determine which turbine or combination of turbines can generate power at the lowest cost. Currently, the heat rate of a turbine is determined by conducting a series of extensive tests on the turbine, while the turbine is "off-line" and out of service. Such tests are costly and time consuming, and do not provide a "real time" heat rate. The data obtained from the tests is used to develop a series of heat rate curves, which are transferred into an Energy Management Computer System used by the dispatch operators to dispatch the power generated. When making dispatch decisions, such as determining which turbines should be placed "on-line" and for what period of time, or determining when to buy power from other utilities instead of generating the power, or determining to generate power which can be sold to other utilities for a profit, it becomes increasingly important to have accurate heat rate data and curves.

Since the heat rate data is currently obtained by taking each turbine out of service for a period of time, the costs associated with performing the test and obtaining the heat rate data is substantial. As a result, heat rate measurements are typically performed on each turbine once or twice a year.

Because the actual heat rate data is obtained relatively infrequently, various problems arise in the dispatching of the electrical power. One problem associated with current heat rate measuring techniques is that minor deviations in the heat rate occur from, for example, normal wear and tear of the turbine, performance degradation of condensers, air and water temperatures supplied to the turbine, and the quality of the fuel supply. More significant deviations in the heat rate occur when the equipment utilized to generate the power, such as water pumps and forced air blowers, are either out of service or running at a reduced efficiency rates. When the heat rate deviations occur between the time of the actual heat rate determinations, e.g., typically, once or twice a year, the dispatch operator does not have accurate heat rate data to economically dispatch the power generation. As a result, instances occur where dispatch operators place turbines "on-line" which are operating below maximum efficiency. Thus, the price charged to customers does not accurately reflect the cost to the utility to generate the power and the profit margin may be reduced or the utility may be selling the electricity to customers or other utilities at a loss.

Another problem associated with dispatching electrical power from inaccurate heat rate data occurs when dispatching the power between utilities connected to power grids. When dispatching power generation, the costs of power generation, the purchase of fuel, and the sale of power between utilities is carefully calculated to provide maximum cost advantages for the utility. The costs associated with the operation of each turbine, whether it is in operation (i.e., "on-line") or on stand-by (i.e., "off-line"), are compared with the costs of purchasing power available from other utilities and the possible sale of power to other utilities. For example, in certain instances the dispatch operator may place a turbine "on-line" for the primary reason of selling the power generated at a profit to another utility, or the dispatch operator may place a turbine "off-line" if power can be purchased from another utility for less than the cost of generating the power locally. However, if the heat rate data used to dispatch the electric power is inaccurate, any cost savings believed to be achieved may also be inaccurate.

To efficiently and economically produce the electricity, electric utilities have utilized data acquisition and control systems to dispatch electric power. Existing data acquisition and control systems have evolved around the concept of a centralized data acquisition processor and a common database which provides data to dispatch operators for dispatching of the power generation. Many of the current designs utilize sensors extending into predetermined data acquisition points within the power generation system. These sensors acquire data relating to the status and efficiency of the turbines. However, these systems do not solve the problem of out-of-date heat rate data.

Another drawback to such centralized data acquisition and control systems is that the failure of one element within the system may render the entire data system inoperable making it impracticable for the dispatch operator to economically dispatch the power. Furthermore, as the common database of such a centralized system increases in size, the processing load on the central processor reduces the ability of the data acquisition and control systems to operate in real time.

An additional factor which should be incorporated into the economic dispatching of electrical power, is the quality of the exhaust emissions generated by operating each turbine. To illustrate, boilers are utilized to generate steam for the turbines. Each boiler burns fuel (either oil, gas, coal, wood, or the like or a mixture thereof) and emits exhaust gases and particles into the atmosphere via exhaust stacks. Before permitting the exhaust gases and particles to travel up the exhaust stack, many generating units filter or scrub the exhaust to clean out undesirable contaminants in order to satisfy governmental guidelines on the amounts of contaminants that may be released into the atmosphere in a given period of time. Because of these guidelines, the question of which turbine to utilize, at what capacity and for how long, not only depends on the economics of power generation versus power transactions, but also on the emission quality associated with each possible operational configuration of the turbines.

In order to properly determine which operational configuration, i.e., the number of turbines and which particular turbines, should be utilized, computer systems are utilized to continuously evaluate the emission quality exiting the exhaust stacks for each turbine. However, such computer systems are passive systems which do not respond to the data received from the exhaust emissions, i.e., these systems simply provide the dispatch operator with reports reflecting the quality of each turbine.

Therefore, a need exists for a data acquisition system which ascertains heat rate data in real-time to continuously provide dispatch operators with accurate heat rate data for optimum dispatching of the electrical power. A need exists for a system which incorporates emission quality data into the dispatching of the electrical power. Further, a need exists for a decentralized power generation system constructed in modules which are interconnected by a data network to prevent overloading of a single processor as well as to reduce the effects of a single malfunction on the entire system.

SUMMARY OF THE INVENTION

The present invention relates to a method for dispatching electrical power. In one embodiment, the method includes measuring operating parameters for a plurality of power generating units to obtain real-time heat rate data for each of the plurality of power generating units, and calculating the real-time heat rate for each of the plurality of power generating units from the heat rate data. Once the heat rate for each power generating unit is ascertained, various configurations of power generating units which satisfy the load requirements of a geographic area are determined. The cost of generating electrical power for each the configuration is then determined. Preferably, the cost determination is based upon the real-time heat rate data. For economic dispatching of the electrical power, one of the configurations with the lowest power generating cost is selected and the power generating units are placed on-line. Alternatively, the step of dispatching may also include comparing the cost for generating power with a cost for purchasing power from other utilities. Whichever results in lowest costs for the power will be selected.

In another embodiment, the method includes measuring operating parameters for a plurality of power generating units to obtain real-time heat rate data for each of the plurality of power generating units, and measuring emissions associated with each the plurality of power generating units to obtain emission data. The real-time heat rate for each of the plurality of power generating units is then calculated from the heat rate data.

Once the heat rate for each unit is known, various configurations of power generating units and their associated operational costs which satisfy load requirements of a geographic area are determined. In this embodiment, the cost determination is based upon the real-time heat rate data and the emission data. For economic dispatching of the electrical power one of the configurations with the lowest power generating cost is selected.

The present invention also provides a system for dispatching electrical power generated from remote locations. The system includes a plurality of power generating units each having a plurality of sensors for measuring operating parameters of each unit, and at least one processor configured to receive the measured operating parameters, to calculate real-time heat rates for each of the plurality of power generating units, and to dispatch the electrical power in response to the real-time heat rates.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Figure 1:
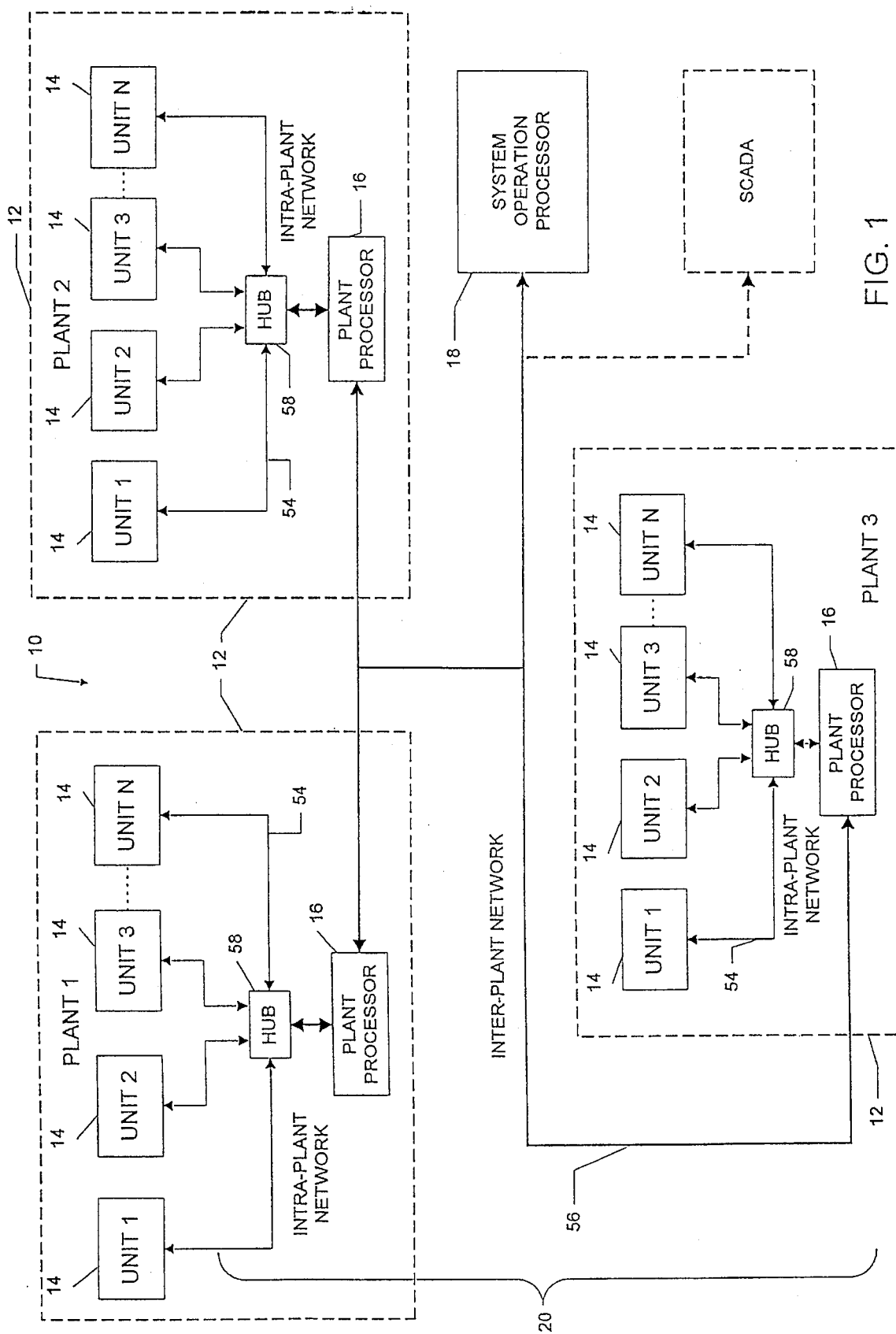
FIG. 1 is an exemplary block diagram of the power generating system of the present invention, illustrating a plurality of power generating plants interconnected by an inter-plant network.
Figure 2:
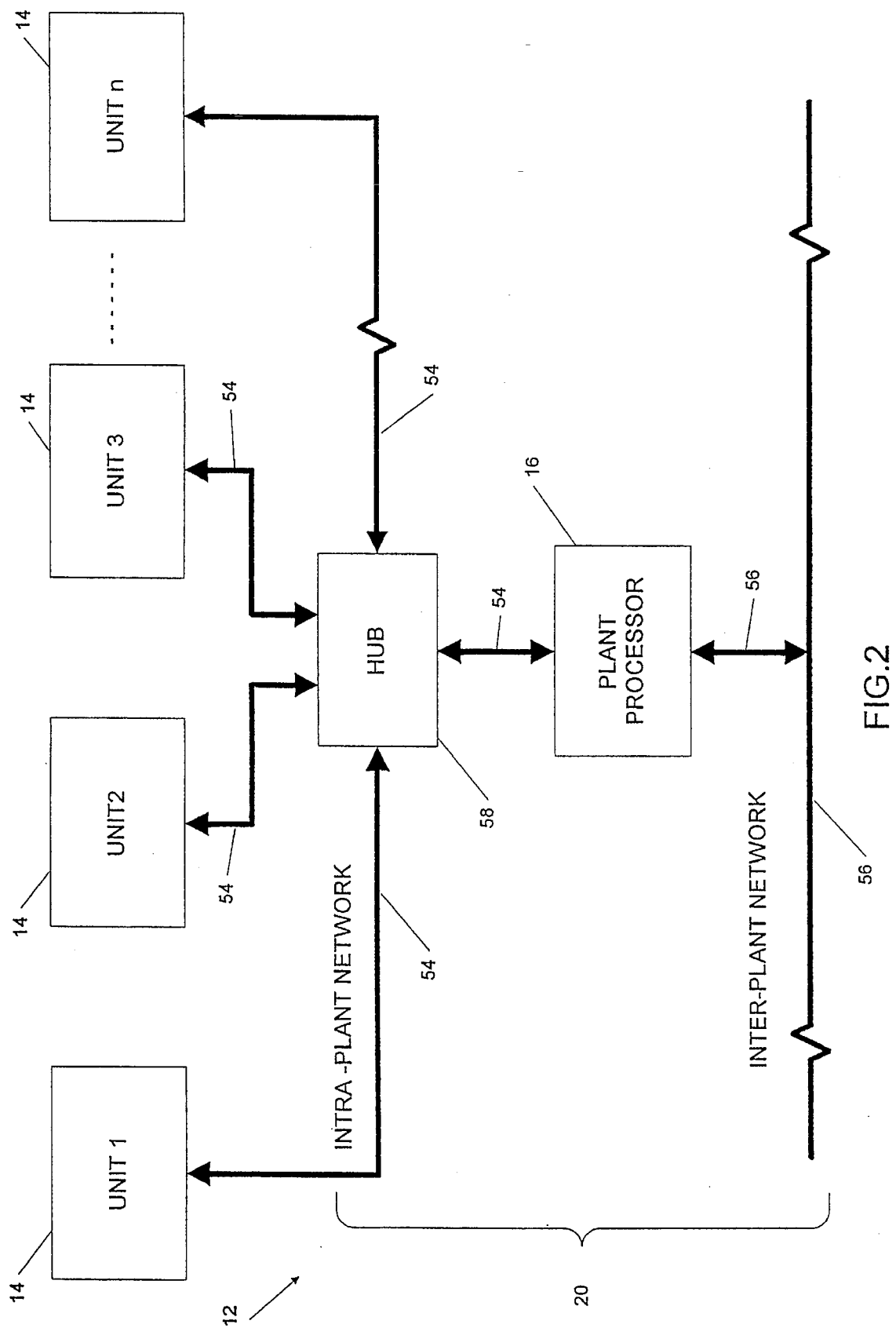
FIG. 2 is a block diagram for a power generating plant shown in FIG. 1, illustrating a plurality of power generating units within the plant interconnected by an intra-plant network.

Generally, electrical power is generated by a utility at power generating plants dispersed across a wide geographic area. The power generating plants are interactive with a system operation processor to provide electric power to the geographic area which together form a power generating system 10. Typically, as shown in FIGS. 1 and 2, each power generating plant 12 within the system has a plurality of power generating units 14 connected to a plant processor 16 which receives data from each unit for subsequent processing. The plant processor 16 is connected to a remote system operation processor 18 which performs dispatching functions according to the present invention, as well as other functions associated with the power generating system 10. In this configuration, each power generating unit 14 may be selectively actuated in a cost effective manner to satisfy the load requirements of the utility. Data communications between the power generating units 14 and the processors 16 and 18 is accomplished utilizing a data communication network 20 which will be described in more detail below.

Processors 16 and 18 are known computers which include a central processing unit, memory for storing data and programs (e.g., system and application programs), serial and/or parallel communication ports for connection to the data communication network 20 and I/O ports for user interaction with the processor. Examples of suitable processors include an IBM RS6000 POWERSERVER®, a SUN SPARC WORKSTATION®, an Hewlett Packard APOLLO®, a DEC ALPHA® or equivalent processing systems.

Figure 3:
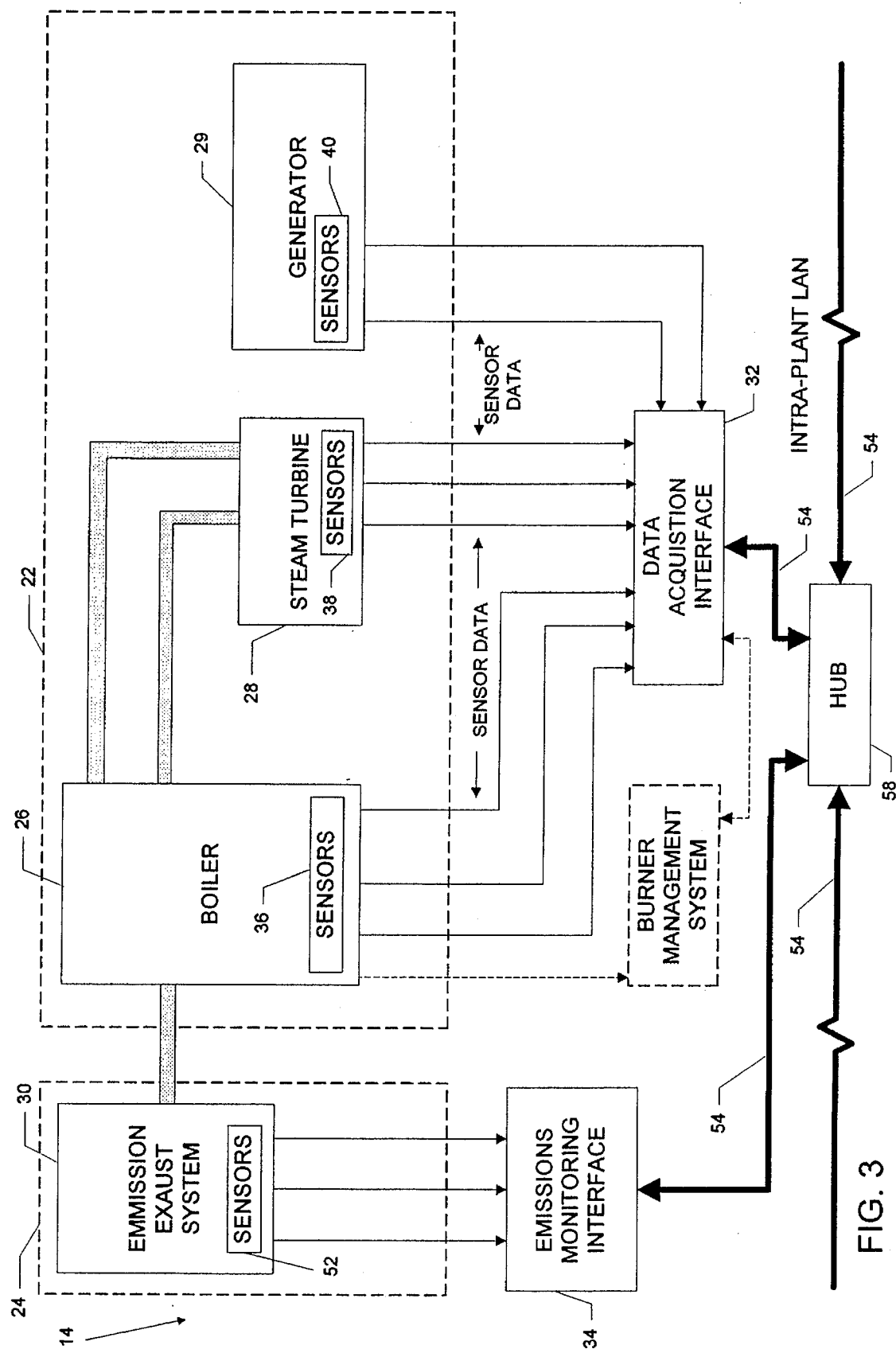
FIG. 3 is a block diagram of a power generating unit shown in FIG. 1, illustrating a real-time data acquisition interface connected to a plurality of sensors within a turbine.

Generally as shown in FIG. 3, each power generating unit 14 includes a power generation portion 22 and an exhaust emission portion 24. Typically, the power generation portion 22 of the system of the present invention, includes a boiler 26 which burns oil, gas, coal, wood or the like or a mixture of both, and a steam turbine 28 which drives a generator 29 to generate the electrical power. The exhaust emission portion 24 includes emission exhaust system 30 which is provided to release gas emissions generated by the boiler 26 into the atmosphere. A data acquisition interface 32 associated with the system of the present invention, is provided to collect data associated with the equipment used to generate power, e.g., the boiler, steam turbine and the generator, and an emission monitoring interface 34 is used to collect emission data from the exhaust system 30.

Referring again to FIG. 3, each power generating unit 14 also includes sensors 36, 38 and 40 which are connected to the boiler, steam turbine and generator, respectively. The sensors are known in the art and are provided to measure, for example, water and air temperature and pressure, fuel flow, electrical power (e.g., current and voltage) and like characteristics of the power generation portion 22 of the power generating unit 14. Data generated by each sensor is transferred to the data acquisition interface 32, to be utilized by plant processor 16 to calculate the real-time heat rate and to generate a heat rate curve utilized by the system operation processor to economically dispatch the electrical power. The heat rate curves provide dispatch operators and/or the system operation processor 18 a plot of points for the different amounts of fuel burned by the power generating unit and provides a corresponding power output of the unit for the particular amounts of fuel burned.

Figure 4:
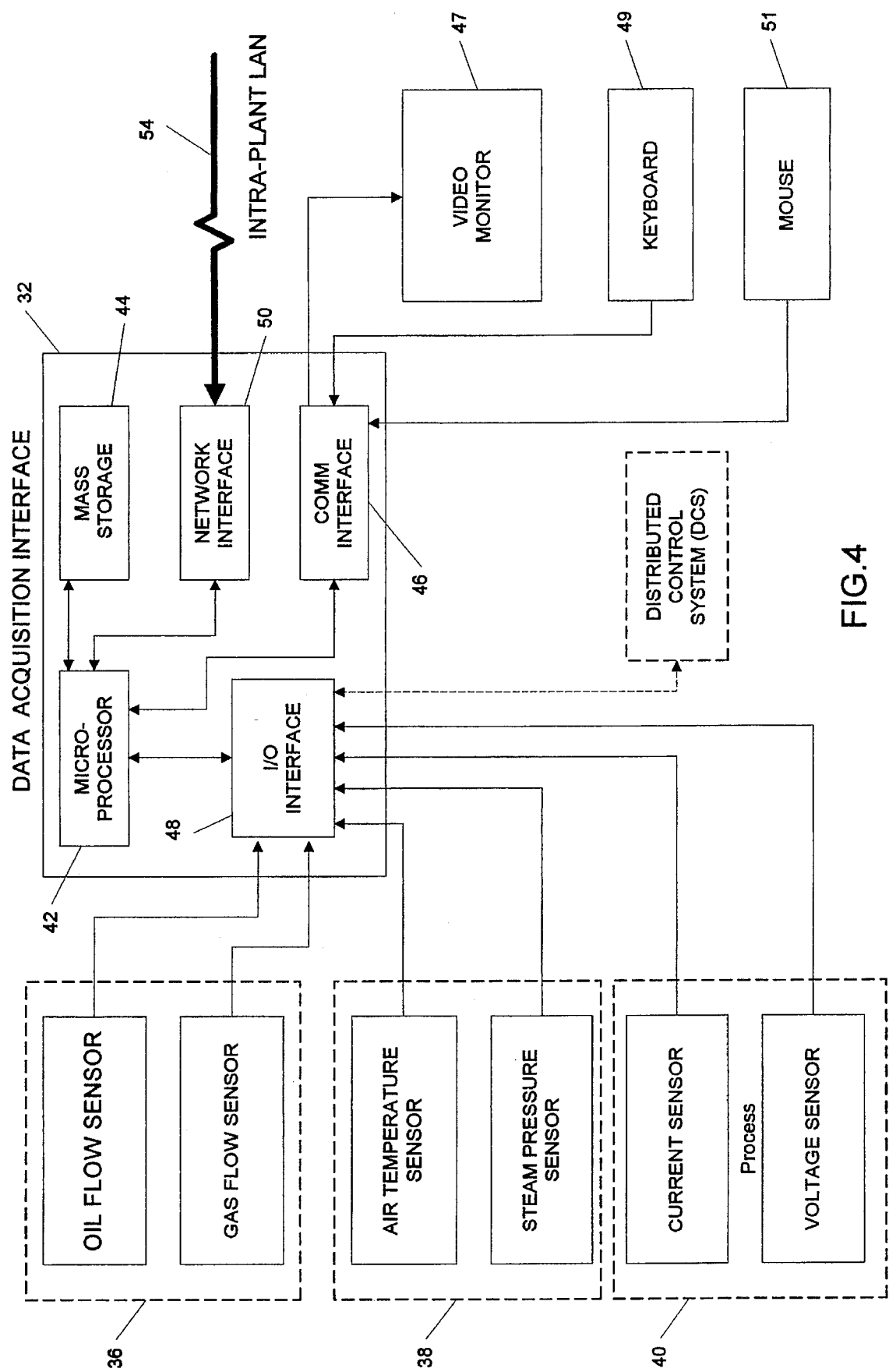
FIG. 4 is a block diagram of the real-time data acquisition interface shown in FIG. 3.

An exemplary configuration for the data acquisition interface (DAI) of the present invention is shown in FIG. 4. As shown, the data acquisition interface 32 includes a microprocessor 42 and mass storage devices 44 for storing system and application programs as well as the sensor data. A suitable mass storage device is a 40 Mbyte hard disk drive or solid state storage device. The DAI 32 also includes a communication interface 46 for user interaction with the DAI. The communication interface 46 may include, for example, a video port for connection to standard video monitors 47, a keyboard port for connection to standard keyboards 49 and a serial port for connection to a mouse 51. An input/output (I/O) interface 48 is connected the sensors 36, 38 and 40 and is used to sample or collect, among other information, the data necessary for calculating the real-time heat rate for each generating unit. The I/O interface is configured to receive analog and/or digital signals from the sensors 36, 38 and 40. Typically, the I/O interface includes a backplane which receives printed circuit boards having connection ports to receive the sensor signals. The data acquisition interface 32 also includes a network interface 50, such as an Ethernet adaptor, capable of transferring data between the DAI 32 and the plant processor 16 at a rate of about 10 Mbits/sec. Preferably, the network interface 50 conforms to the IEEE 802.3 Standard. A suitable data acquisition interface is the Keithley Metrabyte, Inc. Worksmart-386 or -486 or any equivalent type of programmable logic controller (PLC) interface.

Referring to FIG. 4, sensors 36, 38 and 40 are connected to the I/O interface 32 to permit the data acquisition interface to collect the necessary data for the real-time heat rate calculation. Preferably, the data acquisition interface 32 periodically scans or polls each sensor and retrieves and validates the heat rate information received. The heat rate data along with a validation flag are then stored in the memory 44 of the DAI 32.

The following description is an exemplary embodiment for obtaining and processing the sensor data. Approximately every 2 seconds the I/O interface within the data acquisition interface 32, sequentially samples the input from the sensors. Approximately every 5 seconds the DAI microprocessor 42 polls the I/O interface and retrieves the current sensor data. Once the sensor data is retrieved by the data acquisition interface microprocessor 42, the data is validated to ensure that it is within an acceptable range. To illustrate, if the power output of a power generating unit is 250 MWatts, the fuel flow to the boiler should be about one gal./min/MWatt or equivalent input parameter, but not zero. As another illustration, condensers are used to remove heat from the steam, therefore, the discharge water temperature of the condenser should be higher than the intake water temperature of the condenser. Appropriate validation flags are then assigned to each sample value of sensor data and are provided to indicate whether the sampled data is valid or invalid. The validation flags, the sampled data and an associated time flag are then stored in the DAI memory 44. The data stored within the DAI memory 44 is then transferred along the data communication network 20 to the plant processor 16 approximately once every minute. To reduce the volume of data transferred along the network 20, data associated with sensors whose status changes infrequently, such as value position sensors (e.g., open or closed), or tank level monitoring sensors, may be transferred to the plant processor 16 at reduced time intervals, such as once every 15 minutes or on a change in status, without compromising the integrity of the real-time heat rate calculation.

As noted above, economic dispatching of electric power may also incorporate the emission quality exiting the exhaust stacks. Typically, utilities use emission credits which are associated with the emissions being released into the atmosphere when generating electricity. These credits have an inherent monetary value to the utilities. As a result, the utilities may compare the cost to generate power with the cost of the credits used and also compare the costs of selling the credits to other utilities who in return sell power to the utility at a lower cost. In addition, utilities can be charged a fee if the emissions from the power generating units released into the atmosphere do not meet standardized emission quality guidelines, e.g., Federal EPA emission standards. As a result, the cost analysis for efficient and economic dispatching of electrical power may include an analysis of the quality of the emissions released into the atmosphere by each power generating unit 14 and a cost determination with respect to any fees accrued due to the emission quality. The following parameters are examples of the emission data sampled:

Total Heat Input (MMBtu);

Duct gas temperature (avg° F.);

Stack exit velocity (avg ft/sec);

The opacity of the smoke exiting the stack;

The percentage of sulfur dioxide ($SO_2$) present;

The percentage of nitrogen oxides ($NO_x$) present; and

The percentage of carbon dioxide ($CO_2$) present.

To satisfy standardized emission requirements when generating power and for effective dispatching of the electrical power, the emission system 30 is provided with sensors 52 which are connected to the emission monitoring interface 34. The emission sensors include various known sensors which sample the exhaust gases flowing through the exhaust stacks and provides data to the emission monitoring interface 34. For example, the emission sensors may be emission monitors similar to those manufactured by Research Cottrell (KVB). The emission data provides a system dispatch operator with data representing the efficiency of each power generating unit, as well as identifying whether the unit is operating within emission standards.

The emission monitoring interface (EMI) of the system of the present invention includes a microprocessor, memory for storing system and application programs as well as emission sensor data, an I/O interface, a communication interface, and a network interface, all of which are configured and operate substantially similar to the DAI shown in FIG. 4 and described above.

As described above and shown in FIGS. 1 and 4, the system of the present invention utilizes a data communication network 20 for data communications within the system. The data communication network 20 transfers the heat rate and emission data collected from each power generating unit 14, either between the units 14 within the power generating plant, or between each plant 12 and the system operation processor 18. Preferably, the data communication network 20 includes an intra-plant network 54 which performs data transfers within each power generating plant, and an inter-plant network 56 which performs data transfers between the power generating plant 12 and the system operation processor 18. It should be noted that each plant 12 and the system operation processor 18 are typically located in different geographic locations.

The intra-plant network 54, shown in FIG. 1 is connected between each power generating unit 14 within each plant 12 and to the plant processor 16. Preferably, the intra-plant network 54 is an Ethernet local area network (LAN) compatible with the IEEE 802.3 Standard and capable of transferring data at about 10 Mbits/sec. A suitable local area network is the Ethernet LAN which operates over coaxial cable, unshielded twisted pair cable or fiber optic cable. However, those skilled in the art will recognize that numerous local area network configurations may be utilized, such as a token ring LAN or an ARCNET® LAN, and that data rates in excess of 100 Mbits/sec. can be achieved.

Typically, the power generating plants inherently generate electro-magnetic emissions which may interfere with the transfer of data within the power plant. As a result, data transfers within the plant are, preferably, along fiber optic lines to reduce the effects of the electro-magnetic emissions. In addition, the capacity of fiber optic communication lines also permits bulk data, e.g., the data collected from the sensors, to be transmitted throughout the plant at data rates higher than the data rate capacity of conventional coaxial cable.

Referring to FIG. 3, regional data concentrators or hubs 58 are used to connect systems or devices (e.g., the DAI, the EMI, and existing data acquisition systems) associated with each power generating unit 14 to the intra-plant network 54. Preferably, the devices are connected to a regional hub in a star topology to control the data flow to and from each device connected to the hub, and to automatically segment and isolate malfunctioning devices connected to the hub 58 without interfering with the operation of the remaining devices. The hubs 58 in the intra-plant network 54 are connected together using, for example, a standard Ethernet spine which as noted above may be a coaxial cable or, preferably, a fiber optic cable.

To illustrate, information flowing from one power generating unit 14 (the source unit) to another power generating unit 14 (the destination unit) is bridged through a regional hub associated with the source unit, transmitted along the primary fiber optic cable and received at a regional hub associated with the destination unit. In this configuration, if a malfunction occurs in the primary fiber optic cable, the regional hubs continue to operate independently so that data may be exchanged between the devices connected to the hub. To prevent the down-time associated with a primary cable failure, a secondary fiber optic cable may be connected parallel with the primary fiber optic cable and the hubs may be configured to select which cable to transfer data along.

Referring again to FIG. 1, the inter-plant network 56, preferably a wide-area network (WAN), is connected to the plant processor 16 within each power generating plant 12 and to a system operation processor 18. The plant processor 16 performs the real-time heat rate calculations for each power generating unit 14 within the plant and generates a heat rate curve which is utilized to dispatch the electrical power as described below. In addition, the plant processors 16 provide a central point for data transfers to and from the system operation processor 18. Utilizing the above described network configuration, the plant processor 16 continues to perform functions associated with the operation of the plant, e.g., control machinery within the unit, even if the inter-plant network 56 is not operational. In such instances, the plant processor 16 will store the real-time heat rate data and transfer the data to the system operation processor 18 when the inter-plant network 56 becomes operational.

The inter-plant network 56 allows for plant personnel connected on the data communications network 20 in any plant location to obtain and utilize the operational data relating to each power generating unit 14 including the real-time heat rate and emission data. The data communication network 20 also permits personnel connected to the network to access the existing data acquisition systems, e.g., the DCS, the BMS and the SCADA described hereinbelow, to retrieve or enter data to those systems without having to physically travel the distances between the plants.

Generally, the basic structure of the inter-plant network 56 is two part. The first part is the interface between the intra-plant and the inter-plant networks. Preferably, a bridge/router system is utilized to control the data flow between networks. The bridge/router system will receive information packets transferred along the intra-plant network 54 from a source plant location and extract the packets which are destined for another power generating plant 12 or the system operation processor 18 (i.e., a remote location). The extracted information packets are transferred along the inter-plant network 56 to the remote location. At the remote location, another bridge/router system receives the data on the inter-plant network 56 and distributes the data to the intra-plant network 54 for transfer to the proper power generating unit 14, or to the system operation processor 18. Bridge/router systems capable of transferring the proper data between networks are known in the art. A CISCO ROUTER OR WELLFLEET ROUTER are examples of suitable bridge/router systems.

The second part of the inter-plant network 56 is the physical medium connected between each bridge/router system. In the preferred embodiment, the medium utilized is the T1–3 telephone lines. However, other mediums may be utilized by those skilled in the art, such as private lease lines, satellites, microwave transmissions, or fiber optic lines installed between locations.

In addition, the data communication network 20 is preferably compatible with existing data acquisition systems and devices currently monitoring and controlling the operation of the power generating units. Compatibility between existing data acquisition systems and the system of the present invention facilitates the transfer of data between the different systems used to generate electrical power. Examples of such existing data acquisition systems include burner management systems (BMS), distributed control system (DCS) and supervisory and data acquisition systems (SCADA). The BMS is a computer operated control system which maximizes the burn of fuel in the boiler and/or acts as a plant SCADA system. The BMS adjusts for example, fuel flow jets, the fuel and air mixture, and dampers within the boiler. The DCS controls the operation of electrical controls for each power generating unit, such as pumps, valves and switches. The SCADA system controls the electrical system associated with the distribution of the electrical power after generation. For example, the SCADA system controls circuit breakers, transformers and other switch gear.

Data generated or processed by these existing data acquisition systems may be utilized by the plant processor 16 to calculate the real-time heat rate. Preferably, these existing data acquisition systems are connected to the plant processor 16, the data communication network 20, or to a data acquisition interface 32. The additional data provided by the existing data acquisition systems permits efficient real-time dispatching of the electrical power, as well as providing data which may be utilized by any system, dispatch or plant operator connected to the data communication network 20. Examples of uses of the data include: generating current performance characteristics of the power generating units; analyzing performance trends for each power generating unit to reduce unit malfunctions; and comparing heat rate values calculated over periods of time and emission data for each power generating unit and generating correlation tables between actual operating parameters and optimum operating parameters for each power generating unit.

As noted above, the heat rate calculation of a power generation unit 14 is the primary factor used in determining the operational efficiency of the unit. In general terms, the real-time heat rate can be understood as measuring the amount of fuel being burned, in BTU's, by the power generating unit per MWatt hour (i.e., Heat Rate=MBTU/MWatt Hour). Thus, the real-time heat rate calculations require data related to the amount of electric energy produced and the amount of fuel consumed. Preferably, the following parameters are utilized for the heat rate calculation and are obtained from the sensors within the power generating unit 14:

The gross power output of the main generator in Megawatts (MGMW);

The auxiliary equipment power, i.e., the power utilized by the plant in Megawatts (AGMW)

The main oil flow, i.e., the amount of oil, or other fuel, used by the boiler per unit time (MOF);

The recirculating oil flow, i.e., the amount of oil which flows from the main oil line back to the main oil tank (ROF);

Gas heat content in BTUs (GASFL); and

The heat content of the fuel being burned.

The system 10 of the present invention is configured to collect or obtain such data from the sensors 36, 38 and 40 which are installed at predetermined data acquisition points within the power generation portion 22 of the power generation unit 14. Preferably, these sensors are configured to measure the fuel (e.g., oil and/or gas) flow into each boiler 26 and to measure the output power from each generator 29. Examples of suitable sensors include, current meters, volt meters, and fuel meters. However, data provided by the existing data acquisition systems (e.g., the DCS, the BMS or the SCADA systems described above) and data provided by plant and system operators.

Figure 5:
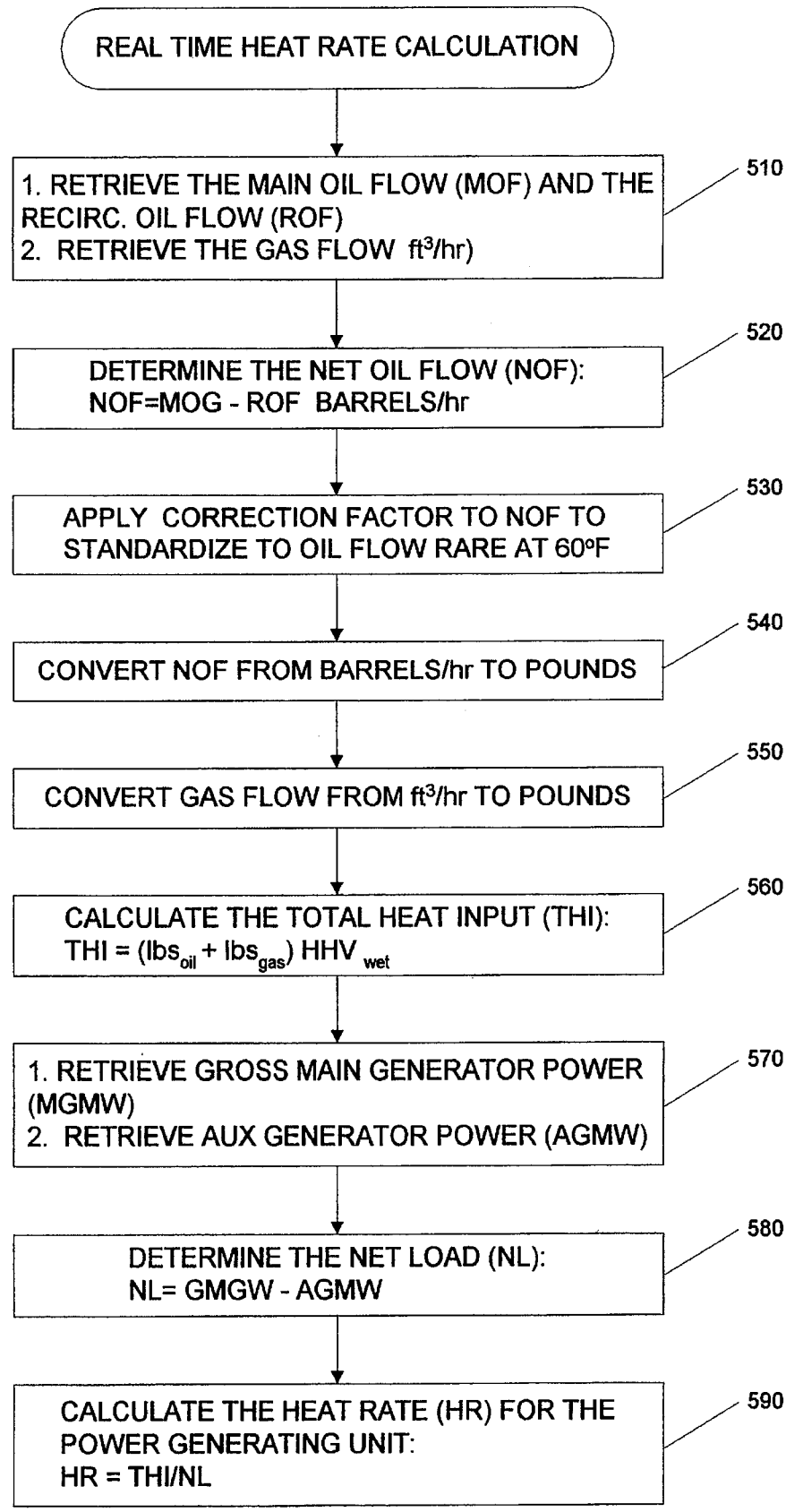
FIG. 5 is a flow diagram for real-time heat rate calculation according to the present invention.

Referring now to FIG. 5, a flow diagram for the real-time heat rate calculation for a single power generating unit is shown. It should be noted that although the heat rate calculation will be described for one power generating unit, the operation of the system 10 of the present invention contemplates determining the heat rates for each of the power generating units connected to the system. As described above, the real-time heat rate of a power generating unit is calculated by dividing the total heat input into the power generating unit 14 by the net load connected to the unit. The total heat input is dependent upon the fuel source supplied to the unit, e.g., oil, gas or a mixture of both. For the illustration of FIG. 5, the following description contemplates a mixture of gas and oil as the fuel source for the unit 14.

To determine the total heat input, the main oil flow, the recirculating oil flow and the gas flow (or other fuel flow) are measured by sensors 36, retrieved by and stored in the data acquisition interface 32 and transferred to the plant processor 16 (step 510). The net oil flow is then determined by subtracting the recirculating oil flow from the main oil flow (step 520). The oil flow rate generally varies depending upon the temperature of the oil. As a result, it is desirable to standardize the oil flow to a specific temperature, e.g., 60° F. To standardize the net oil flow, a correction factor is applied thereto (step 530). For example, if the standardized temperature is 60° F. and the oil temperature is 250° F. then the correction factor is 0.93. Typically, the oil flow measured by the sensors is in barrels per hour and the gas flow is measured in cubic feet per hour. The net oil flow and the gas flow units are then converted to pounds (lbs) (steps 540 and 550) and the total heat input is calculated by adding the pounds of oil flowing into the unit and the pounds of gas flowing into the unit and multiplying that sum by a higher heating value of the oil/gas mixture ($HHV_{wet}$) (step 560). The higher heating value of the mixture is dependent upon the properties of the gas and oil and is known by those skilled in the art. The following is an exemplary expression for the total heat input:

TOTAL HEAT INPUT=$(lbs_{oil}+lbs_{gas})$ $HHV_{wet}$

The net load is then determined by retrieving the values for the gross main generator power (MGMW) and the auxiliary equipment power (AGMW) and taking their difference (steps 570 and 580). Once the total heat input and the net load are determined, the heat rate is calculated by dividing the total heat input by the net load (step 590).

Dispatching

Figure 6:
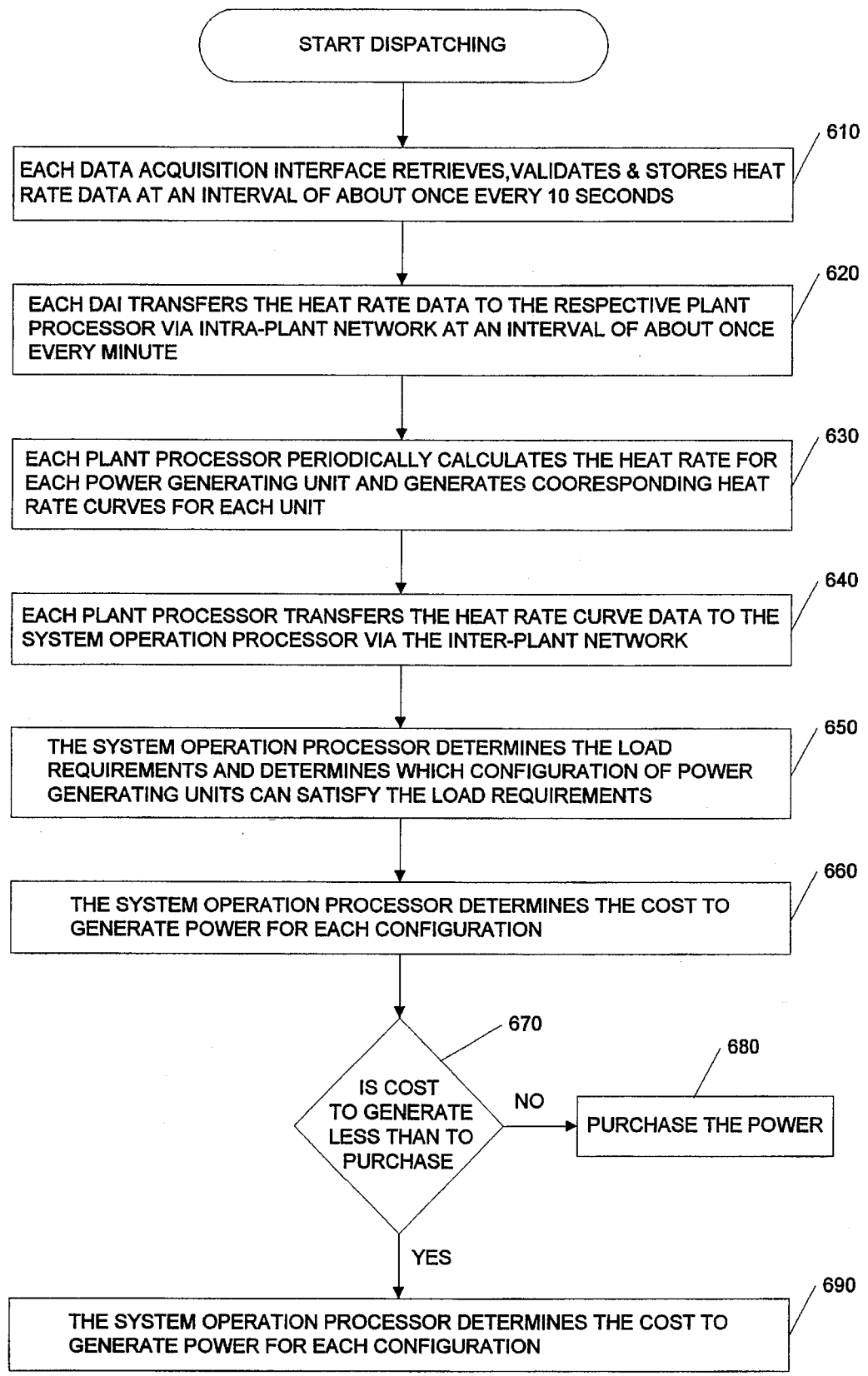
FIG. 6 is a flow diagram for dispatching electrical power using the real-time heat rate data.
Figure 7:
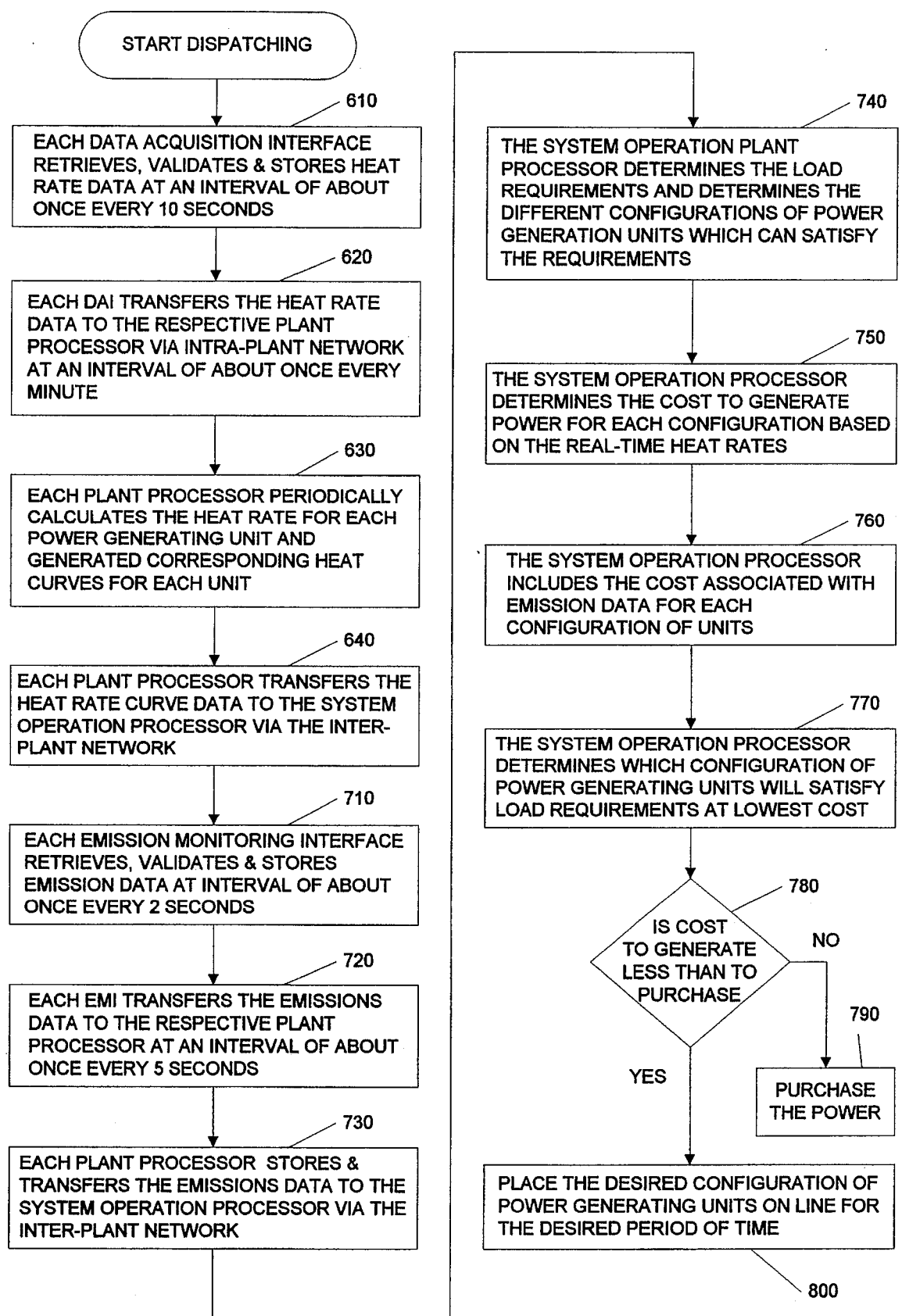
FIG. 7 is a flow diagram for dispatching electrical power using the real-time heat rate data and emission quality data.

As noted above, the system of the present invention is configured to economically dispatch electrical power utilizing the real-time heat rate curves for each power generating unit. FIGS. 6 and 7 represent exemplary dispatching flow diagrams which economically dispatch the electrical power requirements of a utility. However, one skilled in the art will recognize that various other factors or variables may be added to this basic flow diagram to achieve the desired economic dispatching of the power.

FIG. 6 illustrates a dispatching flow diagram which dispatches the electrical power in response to real-time heat rate calculations. Initially, each data acquisition interface 32 of each power generating unit 14 periodically retrieves from the boiler, turbine and generator sensors 36, 38 and 40 corresponding heat rate data (e.g., fuel flow, water temperature and pressure, and power data) and stores the data in DAI memory 44 at a rate of approximately once every 10 seconds (step 610). After six ten second intervals a data frame is formed and the heat rate data is then transferred to and stored in the plant processor 16 at a rate of about once every minute via the intra-plant network 54 (step 620). The plant processor 16 periodically calculates the heat rate and generates a corresponding heat rate curve which as described above, provides a dispatch operator with a plot of fuel burned versus power output (step 630). Preferably, the plant processor calculates the heat rate and generates the heat rate curve between approximately once every minute and once every 5 minutes respectively. The heat rate data curve is then transferred via the inter-plant network 56 to the system operation processor 18 and stored in memory (step 640). The system operation processor 18 determines the load requirements for the utility for a particular period of time. Generally, the load requirements are determined by the SCADA system which then transfers the load data to the system operation processor. Once the load requirements are known, the system operation processor 18 determines which configuration of power generation units 14 in which plant or plants 12 and the necessary operation time for that configuration which will satisfy the load requirements (step 650). The system operation processor 18 then calculates the cost to generate the power for each configuration utilizing the heat rate curves (step 660).

If the utility is connected to a power grid which permits utilities to purchase power from other utilities, the system operation processor 18 compares the lowest cost for generating the power with the cost of purchasing the power from another utility (step 670). If the cost of purchasing the power is less than the cost to generate the power, then the system operation processor 18 either facilitates the purchase of the power or prints a report for a dispatching operator to identify cost savings related to purchasing the power (step 680).

If the cost to generate is less than the cost to purchase, the system operation processor 18 sends appropriate actuation data to the plant processor or processors 16 associated with each power generating unit 14 in the selected configuration for placing the unit or units "on-line" (step 690) or changing the units desired generation (UDG) level, e.g., either increase or decrease the output power of the generator.

FIG. 7 illustrates a dispatching flow diagram which dispatches the electrical power in response to the real-time heat rate calculations and in response to the emission data associated with each power generating unit 14. For simplicity, the acquisition, transfer and calculations of the heat rate data is similar to steps 610–640 shown in FIG. 6 and will not be repeated. As shown in FIG. 7, in addition to the heat rate calculations, each emission monitoring interface (EMI) 34 retrieves, validates and stores the emission data in a similar manner as described above with respect to the data acquisition interface (step 710). Each EMI transfers the emission data to the respective plant processor 16 at an interval of about once every 5 seconds via the intra-plant network 54 (step 720).

The emission data is stored in the plant processor memory and transferred to the system operation processor 18 via the inter-plant network 56 (step 730). The system operation processor 18 determines the load requirements and determines the configurations of power generating units 14 which can satisfy the load requirements at the lowest cost by comparing the heat rate curves for each power generating unit (steps 740 and 750). The system operation processor 18 then computes the cost of producing the power by including the cost of the inherent value of the emission credits used to produce the power, and determines which configuration of units 14 has the lowest overall cost to generate the power (steps 760 and 770). To illustrate, as described above utilities use emission credits when generating power. Thus, the inherent value of the credits used is added to the calculated cost of each configuration of power generating units which can satisfy the load requirements, and a more accurate cost of generating the power is ascertained for each configuration.

Once the system operation processor 18 determines which configuration of power generating units 14 will provide the power at the lowest cost for a particular period of time, the processor 18 then compares the cost to generate the power to the cost to purchase the power from another utility (step 780). If the cost to purchase power (either the total load power or a portion thereof) from another utility is less than the cost to generate the power (either the total load power or a portion thereof) then the desired amount of power is purchased (step 790). As noted above, the system operation processor 18 may facilitate the purchase of the power or may provide a dispatch operator with the necessary information to purchase the power. If the cost to generate the power requirements is less than the purchasing price, then the selected configuration of power generating units 14 are placed "on-line" or changing the desired generation level for the desired period of time (step 800). The system operation processor 18 may provide instructions to the plant processor or processors 16 to place the selected units 14 "on-line" or the system operation processor may provide a plant or dispatch operator with the necessary information to place the proper power generating units "on-line".

It will be understood that various modifications can be made to the embodiments of the present invention herein disclosed without departing from the spirit and scope thereof. For example, different configurations for system components are contemplated, as well as various types of networks which may be utilized to transfer data to remote locations. Also, various modifications may be made in the dispatching process to more economically dispatch the power. Therefore, the above description should not be construed as limiting the invention but merely as exemplifications of preferred embodiments thereof. Those skilled in the art will envision other modifications within the scope and spirit of the present invention as defined by the claims appended hereto.

What is claimed is:

1. A method for dispatching electrical power, comprising the steps of:

utilizing measuring means for measuring operating parameters for a plurality of power generating units to obtain real-time heat rate data for each of said plurality of power generating units, said measuring means including for each power generating unit at least one sensing device for measuring the operating parameters;

utilizing a central processor for polling each power generating unit for retrieving the measured operating parameters;

transferring said measured operating parameters to said central processor at regular intervals for calculating the real-time heat rate for each of said plurality of power generating units from said heat rate data;

obtaining load requirements for a geographical area;

determining configurations of said plurality of power generating units which satisfy the load requirements of a geographic area;

determining a cost of generating electrical power for each said configuration, said cost determination being based upon said real-time heat rate data;

obtaining a price for purchasing power;

comparing said cost determination for generating power with said price for purchasing power and selecting the lowest cost for the power generation; and dispatching the electrical power during a real-time operation of said plurality of power generating units by selecting one of said configurations with the lowest power generating cost if said cost of generating electrical power is less than said price for purchasing power.

2. The method according to claim 1, wherein said step of measuring real-time heat rate data includes:

measuring a flow of at least one fuel source to each said plurality of power generating units; and measuring a power output of a generator associated with each said plurality power generating units.

3. The method according to claim 1, wherein said step of calculating real-time heat rate for each of said plurality of power generating units occurs between about once every minute and about once every five minutes.

4. The method according to claim 1, wherein said step of measuring operating parameters includes measuring oil flow into each said plurality of power generating units.

5. The method according to claim 1, wherein said step of measuring operating parameters includes measuring gas flow into each said plurality of power generating units.

6. The method according to claim 1, wherein said step of measuring operating parameters includes measuring the gross power generated by each of said plurality of power generating units.

7. The method according to claim 1, wherein said step of measuring operation parameters includes measuring the power used by each of said plurality of power generating units.

8. The method according to claim 1, further comprising measuring emission data from said plurality of power generating units wherein said cost determination is further based on said emission data.

9. The method according to claim 8, wherein said step of measuring emission data occurs about once every ten seconds.

10. The method according to claim 8, wherein emission data includes a value of emission credits for producing power.

11. A method for dispatching electrical power, comprising the steps of:

utilizing measuring means for measuring operating parameters for a plurality of power generating units to obtain real-time heat rate data for each of said plurality of power generating units, said measuring means including for each power generating unit at least one sensing device for measuring operating parameters;

measuring emissions associated with each said plurality of power generating units to obtain emission data;

utilizing a central processor for polling each power generating unit for retrieving the measured operating parameters and measured emission data;

transferring said measured operating parameters to said central processor at regular intervals for calculating the real-time heat rate for each of said plurality of power generating units from said heat rate data;

obtaining load requirements for a geographical area;

determining configurations of power generating units which satisfy the load requirements;

determining a cost of generating electrical power for each said configuration, said cost determination being based upon said real-time heat rate data and said emission data; and dispatching the electrical power during a real-time operation of said plurality of power generating units by selecting one of said configurations with the lowest power generating cost.

12. The method according to claim 11, wherein said step of calculating real-time heat rate for each of said plurality of power generating units occurs between about once every minute and once every five minutes.

13. The method according to claim 11, wherein said step of measuring emission data occurs about once every ten seconds.

14. A system for dispatching electrical power generated from remote locations, which comprises:

a plurality of power generating units each including a plurality of sensors for measuring operating parameters of each of said units; and at least one processor configured to poll each power generating unit and to receive said measured operating parameters, to transfer said measured operating parameters to said processor, to calculate real-time heat rates for each configuration of said plurality of power generating units, and to dispatch electrical power in response to said real-time heat rates during a real-time operation of a select configuration of said plurality of power generating units corresponding to a lowest power generating cost.

15. The system according to claim 14, wherein said operating parameters include emission data associated with each of said plurality of power generating units, such that said at least one processor dispatches electrical power based on said emission data.

16. The system according to claim 15, wherein said emission data includes a value of emission credits for producing power.

17. The system according to claim 14, wherein said at least one processor includes at least one remote processor associated with said plurality of power generating units and a central processor, said at least one remote processor being connected to said central processor by a data communication network.

18. The system according to claim 17, wherein each of said plurality of power generating units includes a data acquisition interface connected to said plurality of sensors, said data acquisition interface being connected to said at least one remote processor by said data communication network.

* * * * *